United States Patent [19]

Horiguchi

[11] Patent Number: 5,272,688
[45] Date of Patent: Dec. 21, 1993

[54] APPARATUS FOR WRITING AND/OR READING INFORMATION ON AND/OR FROM OPTICAL CARD

[75] Inventor: Toshio Horiguchi, Hachioji, Japan

[73] Assignee: Olympus Optical Co., Ltd., Tokyo, Japan

[21] Appl. No.: 968,482

[22] Filed: Oct. 29, 1992

[30] Foreign Application Priority Data

Oct. 30, 1991 [JP] Japan .................... 3-284977

[51] Int. Cl.⁵ .............................. G06K 7/10
[52] U.S. Cl. .................... 369/99; 369/44.28; 369/44.29; 235/454
[58] Field of Search ............ 235/454, 479; 369/99, 369/111, 115, 119, 124, 43, 44.11, 44.14, 44.25, 44.28, 44.29; 360/69–72.1, 73.01, 73.04

[56] References Cited

U.S. PATENT DOCUMENTS

| 5,105,072 | 4/1992 | Saito et al. .................... 235/476 |
| 5,184,338 | 2/1993 | Shimoda et al. .............. 369/44.28 |
| 5,204,514 | 4/1993 | Horiguchi ...................... 235/454 |
| 5,216,650 | 6/1993 | Noguchi ........................ 369/44.28 |

FOREIGN PATENT DOCUMENTS 63-19331  1/1988  Japan .
63-37867  2/1988  Japan .
64-27028  1/1989  Japan .

Primary Examiner—Paul M. Dzierzynski
Assistant Examiner—Don Wong
Attorney, Agent, or Firm—Stevens, Davis, Miller & Mosher

[57] ABSTRACT

An apparatus for writing and/or reading information on and/or from an optical card including an optical head having a light source for emitting a light beam and an objective lens for projecting the light beam onto the optical card, a first VCM for driving the optical head in the track direction for effecting a coarse access, a second VCM for moving the optical card in the track direction, and a tracking actuator for moving the objective lens in the seek direction to effect a tracking control. When a desired track is to be accesses, at first the optical head is moved in the seek direction by said first VCM such that the light beam spot is made incident upon a track near the desired track, and then after the movement of the optical card by said second VCM has been judged to be stopped, a deviation of the position of the objective lens with respect to a reference position is detected. After said deviation has been judged to be smaller than a given value, said tracking actuator is driven to effect the track jump by a required number of times to project the light beam onto the desired track. In this manner, the track access can be performed correctly within a short time period without being affected by vibrations of the optical head and optical card and the track skew.

7 Claims, 4 Drawing Sheets

FIG_1
PRIOR ART

FIG_2
PRIOR ART

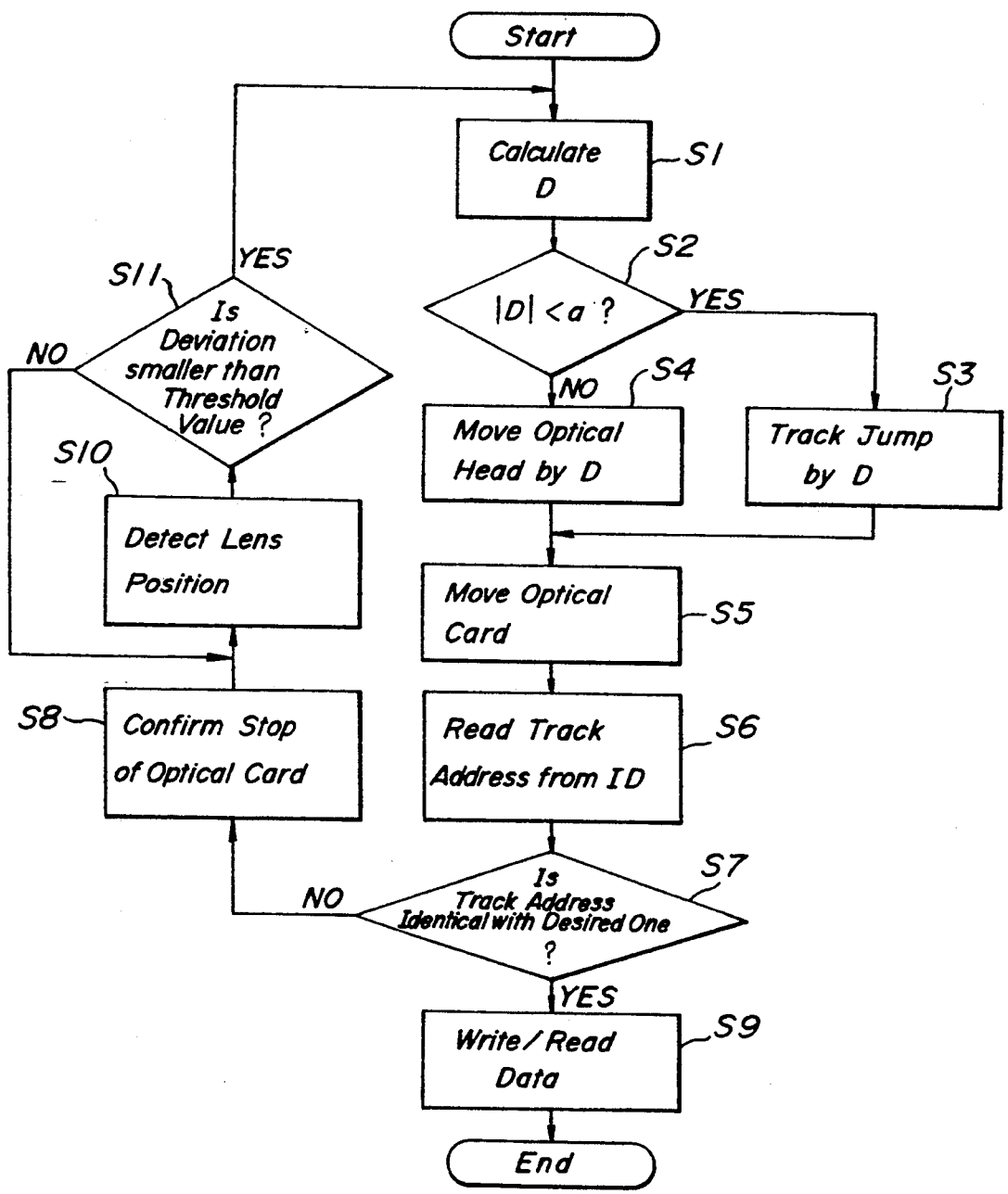

APPARATUS FOR WRITING AND/OR READING INFORMATION ON AND/OR FROM OPTICAL CARD

BACKGROUND OF THE INVENTION

1. Field of the Invention

The present invention relates to an apparatus for reading and/or writing information on and/or from an optical card by moving in a reciprocal manner an optical head for projecting a reading and/or writing light beam and the optical card relative to each other in a track direction in which a plurality of tracks provided on the optical card extend.

2. Description of the Related Art

The optical card has a storing capacity larger than that of a magnetic card by several thousands to ten thousands times. That is to say, the storing capacity of the optical card amounts to one to two mega bytes, so that the optical card is intended to be used as various kinds of cards such as personal health managing card, prepaid card and customer managing card, although the information recorded on the optical card could not be rewritten similar to WORM (write once read many) optical disk.

There have been proposed optical cards having various track formats. For instance, in Japanese Patent Laid-open Publication Kokai Sho 63-37867, there is described an optical card, in which ID (identification) portions are provided at both ends of a track, and in Japanese Patent Laid-open Publication Kokai Sho 63-19331, there is disclosed another optical card in which a data area in a track is divided into a plurality of sectors by sector marks, each consisting of a special pit pattern which does not contain address information.

When the above mentioned optical card is used, the optical card is generally moved in the track direction in which the tracks extend to write and/or read data while the ID portions and sector marks are read out. In order to access a desired track on the optical card, a combination of a coarse access and a track jump is usually adopted. In the coarse access, an optical head including an objective lens for projecting a writing and/or reading light beam onto the optical card is moved linearly in a direction perpendicular to the track direction by means of a linear driving mechanism, while a position of the optical head with respect to the optical card is detected by means of a position detecting means such as a linear scale. Hereinafter, this direction is called a seek direction. In the track jump, the objective lens in the optical head is moved such that a beam spot formed on the optical card is moved in the seek direction track by track.

In the coarse access in which the whole optical head is moved in the seek direction, the optical head could not be moved such that the light beam spot is just made incident upon the desired track due to various factors. For instance, at a time when the optical head is initiated to be moved, the objective lens is sometimes deviated from a reference or neutral position. Further, at a time when the movement of the optical head is stopped, the objective lens is usually deviated from the reference position. Moreover, the optical card is vibrated at the end of the movement. In general, the linear moving mechanism and position detecting means have tolerances and thus the optical head could not always be stopped at a desired position. Usually a difference between a desired track and a track on which the light beam is actually made incident after the coarse access amounts to about ten tracks. In order to correct such a deviation between the desired track and the actually accessed track, the track jump is performed after the movement of the optical head in the seek direction. That is to say, the track jump is repeated by a number of times which is equal to said difference in the track addresses.

Now a known method of performing the track access or seek for an optical card shown in FIG. 1 will be explained with reference to a flow chart illustrated in FIG. 2.

As shown in FIG. 1, an optical card 1 includes an optically recordable area 3 in which a plurality of tracks 2 are arranged in parallel with each other in a track direction. At both ends of each tracks 2 there are formed ID portions 4a and 4b in which information about a relevant track is recorded. Data can be recorded in a data area 5 between the ID portions 4a and 4b.

Now it is assumed that the optical card 1 is stationary, a writing and/or reading light beam spot is formed at a point X1, and an address of a current track onto which the beam spot is made incident is known. At first, in a step S21, a difference D between the address of the current track and an address of a desired track on which the beam spot is to be moved is calculated. Then, in a step S22, an absolute value of the difference D is judged to be smaller than a predetermined threshold value a. When the absolute value of the difference D is smaller than the threshold value a, in a step S23, the track jump is performed in a desired direction. That is to say, in this case, the access time can be shortened by effecting the track jump rather than by performing the coarse access, so that the track jump is repeated by the number of times equal to the difference D. It should be noted that the threshold value a is usually set to four to ten tracks.

When the absolute value of the difference D is equal to or larger than the threshold value a, in a step S24, the coarse access is carried out by a distance equal to the difference D by moving the optical head in the seek direction. Then, the light beam spot is moved into a point X2 on the optical card 1. Next, in a step S25, the optical card 1 is moved in the track direction and in a step S26, a track address recorded in the ID portion 4b is read out. In this manner, an address of the track on which the light beam is made incident is detected. In order to read the information in the ID portion 4b of the track, it is necessary to move the optical head and the optical card relative to each other at a predetermined constant speed. To this end, the points X1 and X2 at which the track jump is performed are set to be remote from the ID portions. That is to say, after the track jump, the movement of the optical card is initiated while the light beam is made incident upon the point X2 and then the movement of the optical card is accelerated up to the given constant speed while the optical card moves over a distance between the point X2 and the ID portion 4b.

If the track access is carried out only by the track jump, in all most all cases the light beam is made incident upon the desired track. However, in the coarse access, the light beam is not made incident upon the desired track as explained above. Therefore, in a step S27, after the coarse access has been finished, it is judged whether the read out track address corresponds to the address of the desired track or not. If no, in a step S28, after the optical card 1 has been moved such that the light beam is made incident upon a point X3, after the relative movement of the optical head and the optical card has been detected to be zero and after a constant waiting time has been elapsed during which the vibration of the optical card and optical head due to the abrupt deceleration has been sufficiently dumped, the process goes back to the first step S21 and a difference D between the current track address and the desired track address is detected. It should be noted that the movement of the optical card is decelerated over a distance between the ID portion 4a and the point X3.

In this case, the difference D between the current track address and the desired track address becomes always smaller than the predetermined threshold value a, so that in the step S23, the track jump is repeated by the number of times equal to the difference D. As the result of this track jump, the light beam is made incident upon a point X4. Then, the optical card 1 is moved in the track direction to read the track address recorded in the ID portion 4a of a track and the read out track address is judged to be identical with the desired track address. When, the read out track address corresponds to the address of the desired track, in a step S30, the data is written in or read out of a data area 5 of the relevant track.

During the recording the data on the optical card and the reading the data out of the optical card, the optical card is moved in the track direction in a reciprocal manner. When the direction of the movement of the optical card is reversed, the abrupt deceleration and acceleration are required, so that not only the optical card but also the optical head are subjected to the mechanical vibration. Due to the mechanical vibration, the track jump could not be performed correctly immediately after the movement of the optical card is stopped. In order to avoid such a problem, in Japanese Patent Laid-open Publication Kokai Sho 64-27028, there is proposed to effect the track jump after the moving speed of the optical card has become substantially zero and after a predetermined waiting time period has been elapsed, the track jump is initiated as shown in the steps S28 and 29 in FIG. 2.

In the known apparatus for writing and/or reading information on and/or from the optical card, said waiting time period is set to be constant. In this case, there are two setting methods. In a first method, the waiting time period is set to be sufficiently long such that any undesired vibrations are completely dumped and the track access could be performed even in the worst case. However, in this case it is apparent that the waiting time becomes long, and therefore the access time becomes long. In a second method, the waiting time period is set to be rather short. In this case, although the access time can be shortened, it is not always possible to perform the track jump accurately and sometimes the desired track could not be accessed.

SUMMARY OF THE INVENTION

The present invention has for its object to provide a novel and useful apparatus for writing and/or reading information on and/or from an optical card, in which the track access time can be shortened and the track jump can be performed always correctly by setting the waiting time period to an optimal value in accordance with vibrating characteristics of the apparatus and conditions under which the apparatus is installed.

According to the invention, an apparatus for writing and/or reading information on and/or from an optical card comprises:

an optical head for projecting a writing and/or reading light beam onto an optical card on which a plurality of tracks are provided in parallel with each other, said light beam spot forming a light beam spot on the optical card;

a first driving means for moving the light beam spot on the optical card with respect to the tracks on the optical card in a seek direction which is perpendicular to a track direction in which said tracks extend;

a second driving means for reciprocally moving the optical card relative to the optical head in said track direction;

a first detecting means for detecting a tracking condition of said optical head with respect to a track on the optical card to derive a tracking condition signal representing the detected tracking condition;

a second detecting means for detecting a relative moving speed of the optical card with respect to the optical head in the track direction to derive a moving speed signal; and a control means responding to said moving speed signal and tracking condition signal, processing said tracking condition signal to judge the tracking condition after the relative moving speed of the optical card with respect to the optical head has been judged to be zero and operating said second driving means such that the light beam spot formed on the optical card is moved in the seek direction track by track to perform a track jump so that a desired track is accessed by the light beam spot, after the tracking condition has been judged to become a predetermined condition.

In the optical card apparatus according to the invention, after it has been confirmed that the relative movement between the optical head and the optical card becomes zero, the tracking condition is detected and after it has been confirmed that the tracking condition becomes the predetermined condition, the track jump is carried out. Therefore, the waiting time period is not fixed, but is changed in accordance with the vibrations of the optical card and optical head, and thus the track access can be performed accurately within a short time period.

BRIEF DESCRIPTION OF THE DRAWINGS

FIG. 4 is a flow chart expressing the track access in the optical card apparatus shown in FIG. 3.

DESCRIPTION OF THE PREFERRED EMBODIMENTS

Figure 3:
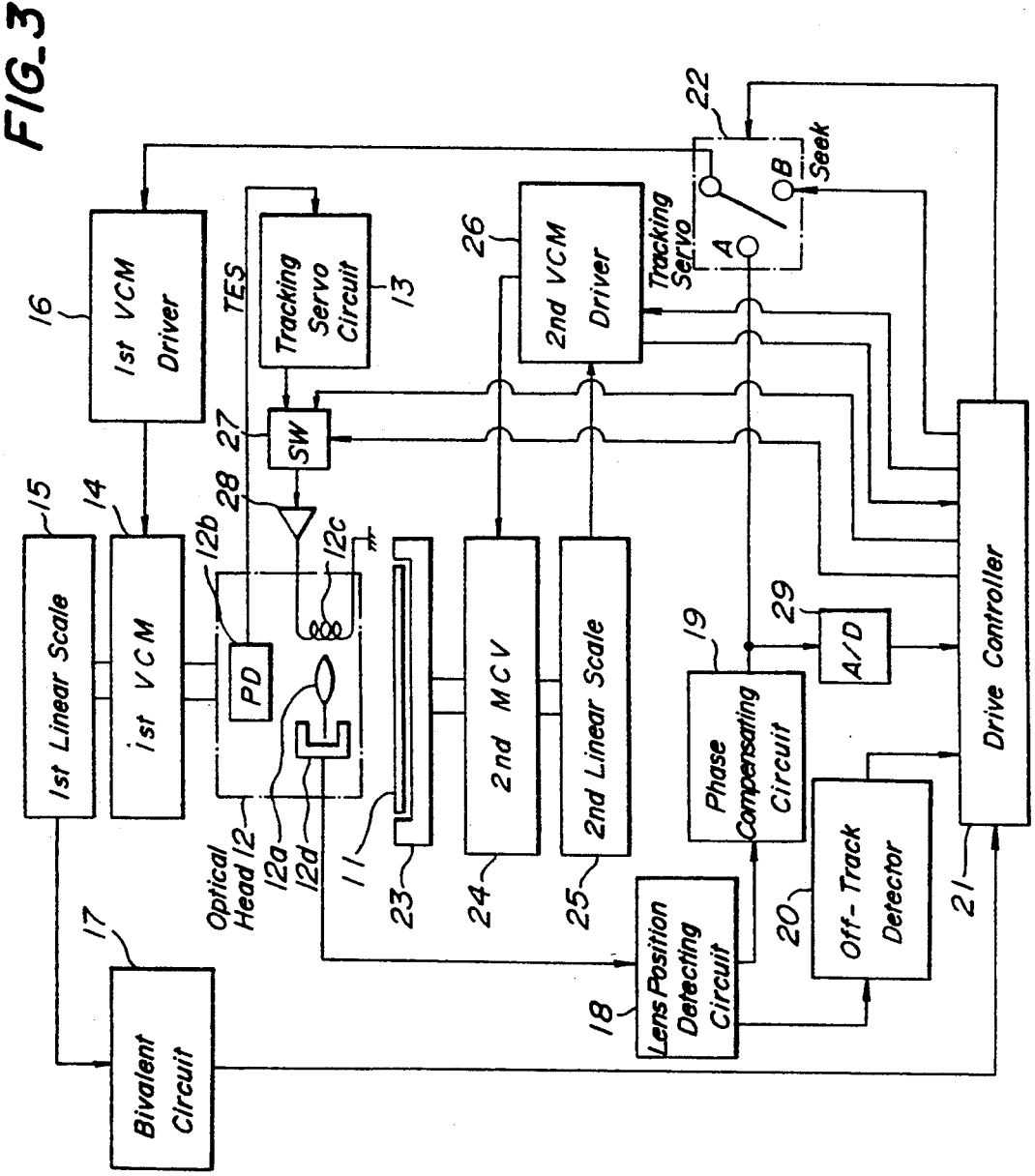
FIG. 3 is a block diagram illustrating an embodiment of the optical card apparatus according to the invention.

FIG. 3 is a block diagram showing an embodiment of the apparatus for writing and/or reading information on and/or from an optical card according to the invention. The apparatus comprises an optical head 12 for writing and/or reading information on and/or from an optical card 11. The optical head 12 comprises a light source such as a semiconductor laser for emitting a laser light beam and an optical system including an objective lens 12a for projecting the laser light beam onto the optical card 11 and a photo detector 12b for receiving a light beam reflected by the optical card. The photodetector 12b of the optical head 12 converts the light beam into an electric signal which is then supplied to a demodulating circuit not shown to derive a reproduced information signal. The electric signal generated by the photodetector 12b is also supplied to a tracking servo circuit 13 as a tracking error signal (TES).

The tracking servo circuit 13 supplies a tracking control signal via switch 27 and amplifier 28 to a tracking actuator 12c provided in the optical head 12 for moving the objective lens 12a in a tracking direction which is perpendicular to a track direction in which a plurality of tracks on the optical card extend. It should be noted that the tracking direction is identical with the seek direction. During the writing and reading, the tracking actuator 12c is driven by the tracking control signal such that the laser light beam spot follows a track on the optical card 11.

The apparatus further comprises a drive controller 21 for controlling the operation of the whole apparatus. In case of effecting the track jump, the drive controller 21 sends a command signal to the switch 27 and produces a track jump pulse. Then, the track jump pulse is supplied to the tracking actuator 12c via the switch 27 and amplifier 28 and the objective lens 12a is moved in the tracking direction such that the light spot on the optical card is jumped over a single track.

The photodetector 12b also supplies a focusing error signal which is supplied to a focusing servo circuit not shown and the focusing servo circuit supplies a focusing control signal to a focusing actuator (not shown) provided in the optical head 12 to move the objective lens 12a in a direction of its optical axis such that the light beam spot is always focused on the optical card 11.

The apparatus further comprises a first voice coil motor (VCM) 14 for moving the optical head 12 in the seek direction perpendicular to the track direction and a first VCM driving circuit 16 for driving the first VCM 14 such that the optical head 12 is moved in the seek direction across tracks on the optical card. There is provided a first linear scale 15 for detecting an amount of the movement of the optical head 12 in the seek direction. An output signal generated by the first linear scale 15 is supplied to a bivalent circuit 17 and a bivalent signal generated by the bivalent circuit is supplied to the drive controller 21. During the usual writing and reading, the drive controller 21 sends a command to a switch 22 and the switch is driven into a side of a contact A. During the coarse access, the drive controller 21 changes the switch 22 to a side of a contact B and supplies a seek control signal to the first VCM driver 16, so that the optical head 12 is moved in the seek direction by means of the first VCM 14 toward a desired track.

The optical head 12 further comprises a lens position detector 12d for detecting a position of the objective lens 12a with respect to a reference position to derive a lens position signal. The lens position signal generated by the lens position detector 12d is supplied to a lens position detecting circuit 18 to detect a deviation of the position of the objective lens 12a from the reference position. In the present embodiment, the tracking condition of the light beam spot with respect to a center of a track is performed by a two-step servo control. That is to say, the tracking error is detected by the photodetector 12b and the tracking servo control is effected by the tracking servo circuit 13 and the tracking actuator 12c.

At the same time, the lens position signal is supplied to the first VCM driving circuit 16 via the lens position detector 12d, lens position detecting circuit 18, phase compensating circuit 19 and switch 22 and the first VCM 14 drives the first VCM 14 such that the objective lens 12a is held at the reference position, i.e. a center position within a tracking servo range by the tracking actuator 12c. In this manner, in the two-step control, the output signal generated from the phase compensating circuit 19 is supplied via an A/D converter 29 to the drive controlled 21 and the drive controller detects the position of the objective lens 12a with respect to the reference position. The output signal from the lens position detecting circuit 18 is also supplied to an off-track detector 20 which supplies an off-track signal to the drive controller 21.

The optical card 11 is placed on a shuttle 23 for preventing the optical card from being curved. The shuttle 23 is moved in the track direction by means of a second VCM 24 which is driven by a second VCM driving circuit 26. The movement of the shuttle 23 in the track direction is detected by a second linear scale 25 and an output signal from the second linear scale is supplied to the second VCM driving circuit 26 such that the shuttle 23 is reciprocally moved in the track direction at a predetermined constant speed and is stopped at a predetermined stop position.

Figure 1:
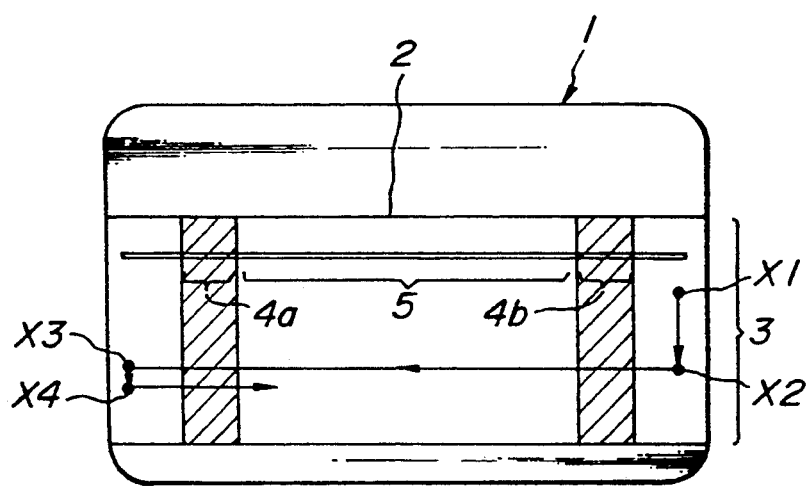
FIG. 1 is a schematic plan view showing the optical card.

Now the operation for accessing a desired track on the optical card will be explained with reference to a flow chart depicted in FIG. 4. It should be noted that the optical card has the same construction as that illustrated in FIG. 1.

Figure 2:
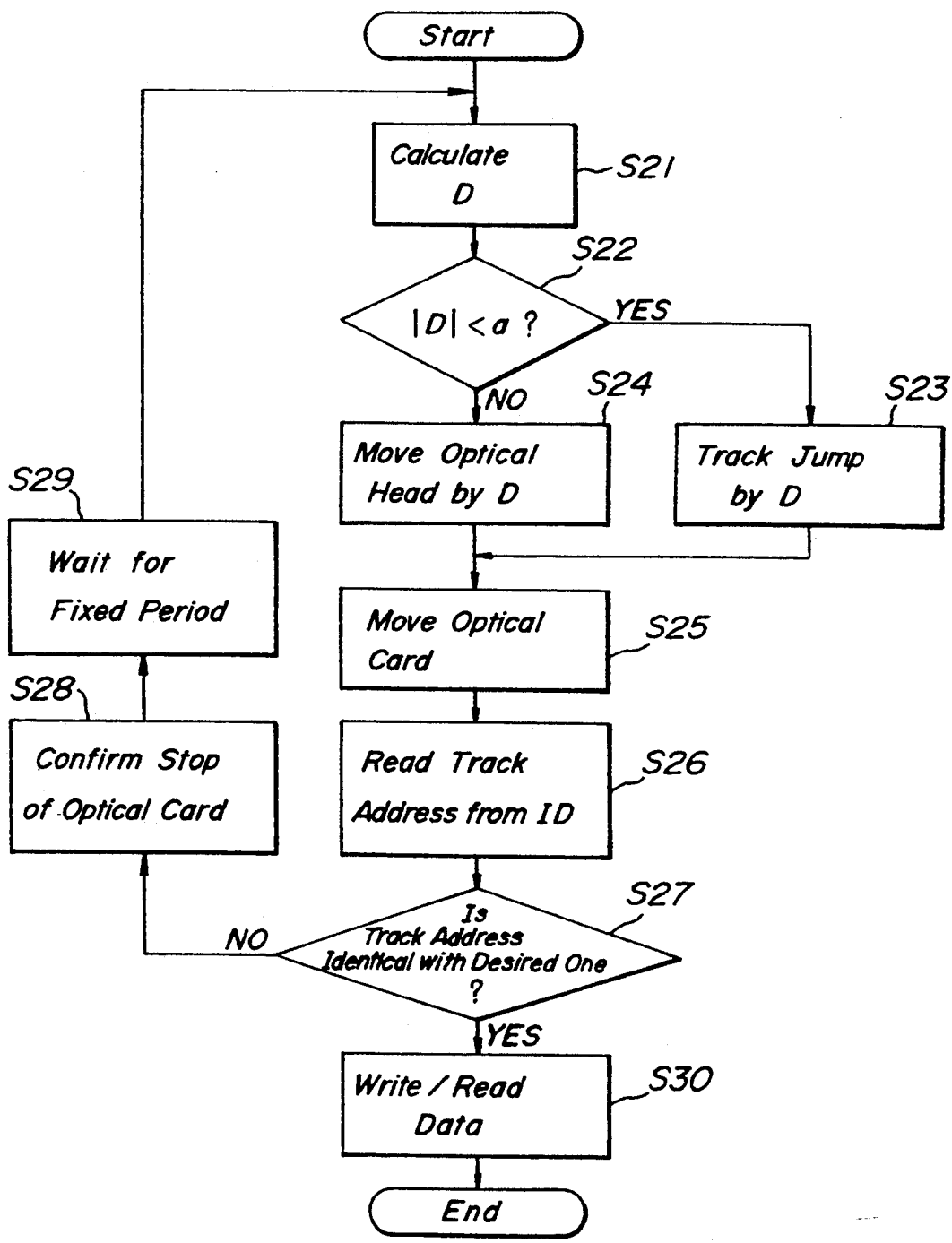
FIG. 2 is a flow chart for representing the known track access method.

Steps S1 to S4 for effecting the coarse access for moving the optical head 12 into a track near the desired track by the first VCM 14 are same as the steps S21 to S24 of the flow chart shown in FIG. 2, so that the operation of the coarse access is dispensed with.

When the light beam spot formed on the optical card 11 has arrived at a track near the desired track, in a step S5, the drive controller 21 sends a command to the second VCM driving circuit 26 and the shuttle 23 is moved in the track direction to read an ID portion of the current track on which the light beam is just made incident, and in a step S6, a track address of the current track is read out. In a step S7, the thus read out track address is compared with the track address of the desired track. When the read out track address corresponds to the address of the desired track, the writing and/or reading operation is performed in a step S9.

When the read out track address does not correspond to the address of the desired track, in a step S8, the moving speed of the shuttle 23 holding the optical card 11 is monitored until the moving speed becomes zero. To this end, the drive controller 21 reads a status of the output signal supplied from the second VCM driving circuit 26 to find that the shuttle 23 is stopped. That is to say, when the movement of the shuttle 23 within a predetermined time interval is detected to be smaller than a predetermined value on the basis of the output signal from the second optical linear scale 25 provided on the shuttle, the relative moving speed can be judged to be substantially zero. The operation so far explained is the same as that of the known method shown in FIG. 2.

In the present invention, after the moving speed of the shuttle 23 has been detected to become zero, in a step 10, the current position of the objective lens 12a with respect to the optical head 12 is sent to the drive controller 21. That is to say, the output signal of the lens position detector 12d provided in the optical head 12 is processed by the lens position detecting circuit 18 and phase compensating circuit 19. An output signal of the phase compensating circuit is supplied to the A/D converter 29 and a digital output signal of the A/D converter is supplied to the drive controller 21 as the lens position signal. Next, in a step S11, the lens position signal is compared with a reference value to derive a difference therebetween. When the difference representing the deviation of the objective lens 12a from the reference position exceeds the predetermined value, it can be judged that the light beam spot is not positioned correctly at a center of a track due to the vibration of the optical card 11 and a track skew at the end of the track jump. This means that the track jump could not be carried out correctly. The track skew is caused by the fact that the tracks on the optical card are not in parallel with the moving direction of the optical card. For instance, when the optical card is manufactured, tracks might be inclined with respect to longer side edges of the optical card, the side edges of the optical card may be deformed and the optical card could not be places always correctly on the shuttle 23.

When it is judged that the deviation of the objective lens from the reference position exceeds the threshold value, the step 10 is repeated until the deviation becomes smaller than the threshold value. In this manner, according to the invention, after the moving speed of the shuttle 23 has become zero, there is not provided a constant waiting time period, but the deviation of the objective lens from the reference position is detected and the track jump is performed after said deviation has become smaller than the predetermined threshold value. In this manner, according to the invention, the waiting time period before the track jump can be always minimum. In other words, when the vibrations of the optical card and optical head are large, the waiting time period becomes long, but the vibrations are small, the waiting time period becomes short. Similarly, when the track skew is large, the waiting time period becomes long, but when the track skew is small, the waiting time period becomes short.

In the step S11, when it is judged that the deviation of the objective lens 12a from the reference position has become smaller than the predetermined threshold value, the step S1 is performed. In this case, the difference D between the current track address and the address of the desired track is usually smaller than the predetermined value a, so that in the next step S3, the track jump is performed to effect the seek operation to the desired track. This fine access can be carried out by supplying acceleration/deceleration pulses to the tracking actuator 12c via the switch 22, the number of said pulses being identical with the difference between the current track address and the address of the desired track.

In general, the tracks on the optical card 11 are subjected to the skew due to the error in the outer configuration of the record medium on a card substrate and the inclination of the track with respect to the optical card moving direction. In order to avoid the influence of the track skew, the two-step servo control is effected on the basis of the tracking error signal and the output signal from the lens position detector 12d for detecting the movement of the objective lens 12a. In the optical card apparatus, the two-step servo control loop has no gain for a frequency higher that 100 Hz, so that the two-step servo control loop is closed also during the track jump. If the two-step servo control loop is opened during the track jump, it is necessary to give an additional waiting time period for settling the unstable condition due to the on-off operation of the two-step servo control loop and thus the access time becomes longer. In order to remove such an additional waiting time period, the two-step servo control loop is remained closed during the track jump.

The present invention is not limited to the embodiment explained above, but many modifications and alternations may be conceived by those skilled in the art within the scope of the invention. For instance, in the above embodiment, the output signal of the lens position detector is used to detect the vibrations in the optical card apparatus and the track skew. However, according to the invention, the tracking error signal representing the deviation of the light beam spot from the center of the track may be used for this purpose. That is to say, a low frequency component of the output signal from the track servo circuit 13 may be supplied to the drive controller 21 to detect the vibrations and track skew.

Further, in the above embodiment, the A/D converter 29 may be constructed by an A/D converter provided in an one-chip microcomputer constituting the drive controller 21. Moreover, instead of the A/D converter, an analog comparator for comparing the lens position signal and a predetermined constant voltage value may be used.

The supply of the lens position signal to the drive controller 21 may be performed by a plurality of times within a given constant time interval under the control of a software provided in the drive controller and the lens position signal within a predetermined range may be utilized as an effective signal. Then, the influence of the vibration of the lens position signal can be minimized.

As explained above in detail, according to the present invention, the waiting time period from the stop of the movement of the shuttle holding the optical card to the initiation of the track jump can be always set to a minimum value in regardless of the fluctuation in the vibrations of the optical card and optical head as well as in the condition under which the optical card apparatus is installed. Therefore, the access to a desired track can be always performed correctly within a short time period.

What is claimed is:

1. An apparatus for writing and/or reading information on and/from an optical card comprising:
   an optical head for projecting a writing and/or reading light beam onto an optical card on which a plurality of tracks are provided in parallel with each other, said light beam forming a light beam spot on the optical card;
   a first driving means for moving the light beam spot on the optical card with respect to the tracks on the optical card in a seek direction which is perpendicular to a track direction in which said tracks extend;
   a second driving means for reciprocally moving the optical card relative to the optical head in said track direction;
   a first detecting means for detecting a tracking condition of said optical head with respect to a track on the optical card to derive a tracking condition signal representing the detected tracking condition;

a second detecting means for detecting a relative moving speed of the optical card with respect to the optical head in the track direction to derive a moving speed signal; and a control means responding to said moving speed signal and tracking condition signal, processing said tracking condition signal to judge the tracking condition, after the relative moving speed of the optical card with respect to the optical head has been judged to be zero and operating said first driving means such that the light beam spot formed on the optical card is moved in the seek direction track by track to perform a track jump so that a desired track is accessed by the light beam spot, after the tracking condition has been judged to become a predetermined condition.

2. An apparatus according to claim 1, wherein said optical head comprises a light source for emitting the writing and/or reading light beam and an objective lens for projecting the light beam onto the optical card, said first driving means comprises a first driver for moving the optical head in the seek direction and a second driver for moving the objective lens such that the light beam spot on the optical card is moved in the seek direction track by track, said second driving means comprises a third driver for moving reciprocally the optical card in the track direction, and said control means is constructed such that after the optical head has been moved in the seek direction by means of said first driver, said moving speed signal is judged to detect the relative movement of the optical card with respect to the optical head is stopped and said second driver is driven to move the objective lens to perform the track jump after it has been confirmed that the tracking condition is in a predetermined range.

3. An apparatus according to claim 2, wherein said first detecting means comprises a first detector for detecting a tracking error representing a deviation of the light beam spot from a center of a track to derive a tracking error signal and a second detector for detecting a deviation of the objective lens from a reference position to derive a lens position signal, and said control means further comprises a first tracking servo control loop for keeping the light beam spot to be made incident upon a center of a track in accordance with said tracking error signal and a second tracking servo control loop for moving the optical head in the seek direction by means of said first driver in accordance with said lens position signal such that the objective lens is held at the reference position.

4. An apparatus according to claim 3, wherein said second detector is constructed such that said reference position is set at a center of a driving range over which the objective lens is moved by said second driver.

5. An apparatus according to claim 4, wherein said control means further comprises a switch for selectively supplying a seek signal to said first driver during a seek time period during which the optical head is moved by said first driver in the seek direction and supplying said lens position signal to said first driver during a time period other than the seek time period.

6. An apparatus according to claim 5, wherein said control means is constructed such that said lens position signal is compared with a predetermined reference value to derive a difference and when it is detected that said difference has become smaller than a predetermined threshold value, said second driver is driven to move the objective lens such that the light beam spot is moved in the seek direction track by track onto the desired track.

7. An apparatus according to claim 6, wherein said control means is constructed such that when a difference between an address of the current track and an address of the desired track is smaller than a predetermined threshold value, said second driver is driven to move the objective lens such that the light beam spot is moved in the seek direction track by track onto the desired track.

* * * * *